(12) United States Patent
Uribe

(10) Patent No.: US 11,928,021 B2
(45) Date of Patent: Mar. 12, 2024

(54) SYSTEMS AND METHODS FOR ADDRESS FAULT DETECTION

(71) Applicant: Micron Technology, Inc., Boise, ID (US)

(72) Inventor: Melissa I. Uribe, El Dorado Hills, CA (US)

(73) Assignee: Micron Technology, Inc., Boise, ID (US)

( * ) Notice: Subject to any disclaimer, the term of this patent is extended or adjusted under 35 U.S.C. 154(b) by 61 days.

(21) Appl. No.: 17/711,002

(22) Filed: Mar. 31, 2022

(65) Prior Publication Data

US 2023/0315564 A1 Oct. 5, 2023

(51) Int. Cl.
*G06F 11/00* (2006.01)
*G06F 11/10* (2006.01)

(52) U.S. Cl.
CPC ...... *G06F 11/1016* (2013.01); *G06F 11/1044* (2013.01)

(58) Field of Classification Search
CPC ............. G06F 11/1044; G06F 11/0727; G06F 11/1016
See application file for complete search history.

(56) References Cited

U.S. PATENT DOCUMENTS

| | | | | |
|---|---|---|---|---|
| 6,457,067 | B1* | 9/2002 | Byers | G11C 29/024 714/49 |
| 7,293,221 | B1* | 11/2007 | Wong | G06F 11/1016 714/768 |
| 2001/0056567 | A1* | 12/2001 | Sakurai | G06F 11/106 714/E11.052 |
| 2008/0235558 | A1* | 9/2008 | Normoyle | G06F 11/1016 714/768 |
| 2016/0203045 | A1 | 7/2016 | Suzuki | |
| 2018/0150352 | A1* | 5/2018 | Adham | G06F 11/1016 |
| 2020/0110659 | A1* | 4/2020 | Foley | G06F 11/1016 |

* cited by examiner

*Primary Examiner* — Joseph D Manoskey
(74) *Attorney, Agent, or Firm* — Fletcher Yoder, P.C.

(57) ABSTRACT

A memory device is provided. The memory device includes a memory bank configured to store data in one or more memory cells. The memory device further includes an address fault detection system designed to detect a mismatch between the address originally used to store the data and the address subsequently used to read the data. The address fault detection system generates an address parity bit from the received address and either stores that address parity bit with the user data or uses the address parity bit to invert the internal ECC bits generated from the user data. The address fault detection system can determine from the resulting syndrome from the ECC bits whether or not an address fault has occurred and raise an address fault indication flag if the address fault is detected.

20 Claims, 4 Drawing Sheets

SYSTEMS AND METHODS FOR ADDRESS FAULT DETECTION

BACKGROUND

Field of the Present Disclosure

The present disclosure relates to fault detection, and more specifically, to systems and methods for address fault detection.

Description of Related Art

Certain read/write memory devices, such as dynamic random access memory (DRAM), include arrays having memory cells that store information. For example, certain DRAM devices, such as synchronous dynamic RAM (SDRAM) devices may have multiple memory banks having many addressable memory elements or cells included in memory arrays. Similarly, persistent memory devices such as random access memory (RAM), non-volatile memory, and the like, may include memory elements or cells suitable for storing data. In use, the memory devices may receive data input signals at high speeds, such as speeds of 1 gigabits per second (Gbps) or more, and store data in the memory cells based on the data input signals. The memory cells may then be accessible to external systems (e.g., host chip hosting the memory device) and may be used to retrieve the data stored therein, for example, by providing for an address of one or more of the memory cells. It would be beneficial to improve the addressing for the memory devices.

Embodiments of the present disclosure may be directed to one or more of the problems set forth above.

BRIEF DESCRIPTION OF THE DRAWINGS

Various aspects of this disclosure may better be understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Many electrical devices may include memory devices coupled to processing circuitry, and the memory devices may provide storage for data processing. Examples of memory devices include random access memory (RAM), dynamic RAM (DRAM) devices, synchronous DRAM (SDRAM) devices, and non-volatile memory devices, which may all store individual bits electronically. The stored bits may be organized into addressable memory elements (e.g., words), which may be stored in memory banks. To receive and to transmit the bits, the memory devices may include certain data communications circuitry as well as communication lines, useful in saving and retrieving the bits from the memory bank. In certain memory systems, including certain persistent memory systems, memory addressing may be improved via an address fault detection system, as further described below.

In certain embodiments, an error correction code (ECC) system may be used to detect, and in some cases, resolve, data errors that may arise. For example, incorrect bits may be retrieved via a memory read command and the ECC system may detect, and in some cases correct, the read data. The ECC system may additionally raise a flag if, for example, correction may not be possible. The techniques described herein may work in conjunction with an ECC system to additionally or alternatively detect, and in some cases, correct, address issues, such as memory address issues. For example, an address fault detection system may use a "scrambling" of certain parity bit(s) in the ECC to denote an address fault. During reads, the parity bit(s) may be descrambled, and the resulting parity bit(s) may then be used to detect address issues. For example, a memory address may be used to both scramble and to descramble the ECC bit(s). Accordingly, if an incorrect memory address is used during a read, for example, the descrambled ECC bit(s) may not resolve into ECC bit(s) that would result in the ECC system validating the read. A flag or warning may then be raised, indicative of the presence of an incorrect memory address.

Figure 1:
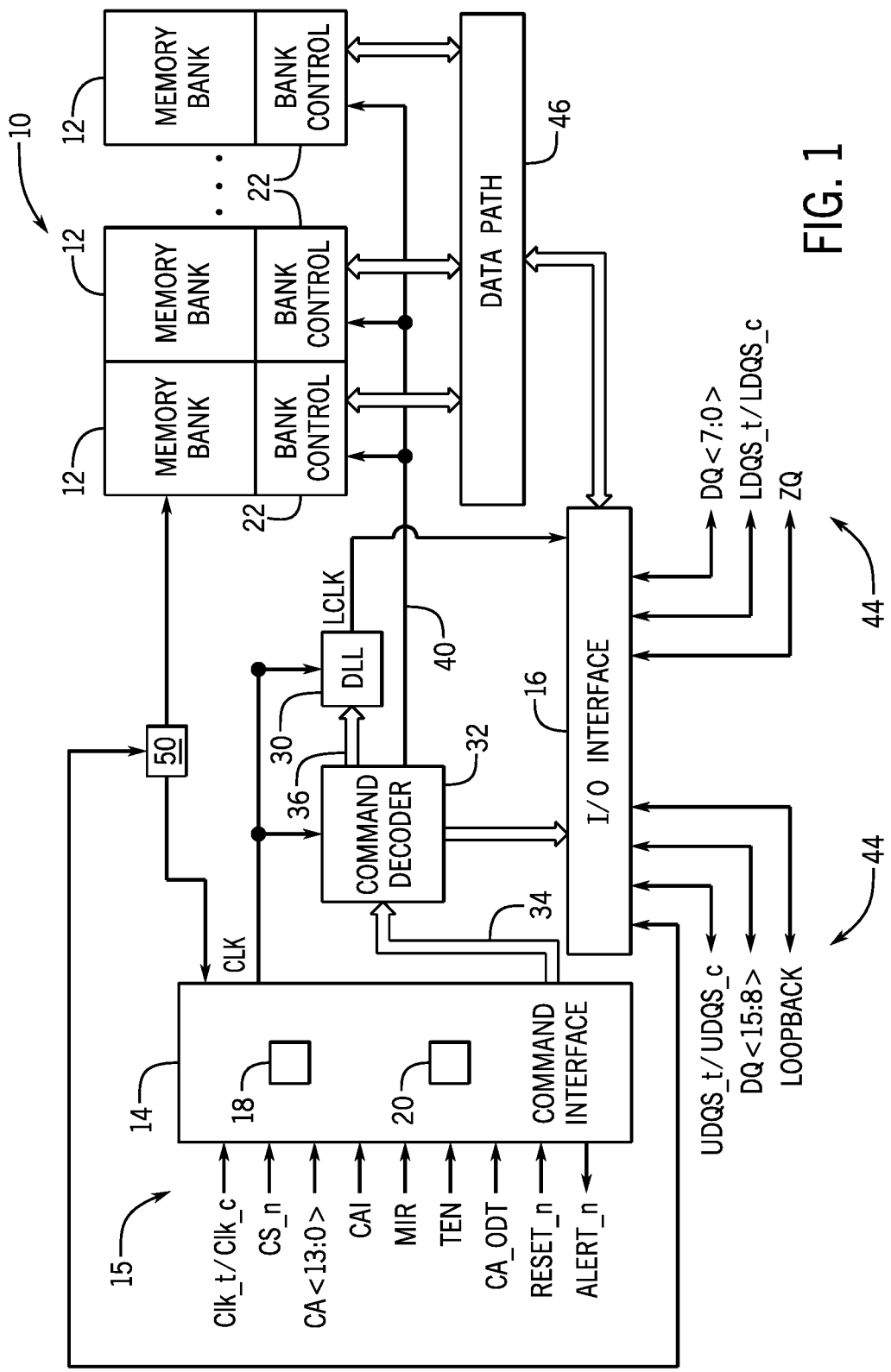
FIG. 1 is a block diagram illustrating an organization of a memory device that may include a memory array and address fault detection system, in accordance with an embodiment.

Turning now to the figures, FIG. 1 is a simplified block diagram illustrating certain features of a memory device 10. Specifically, the block diagram of FIG. 1 is a functional block diagram illustrating certain functionality of the memory device 10. In accordance with one embodiment, the memory device 10 may be a double data rate type five synchronous dynamic random access memory (DDR5 SDRAM) device. Various features of DDR5 SDRAM as further described herein allow for reduced power consumption, more bandwidth, and more storage capacity compared to prior generations of DDR SDRAM.

The memory device 10, may include a number of memory banks 12. The memory banks 12 may be DDR5 SDRAM memory banks, for instance. The memory banks 12 may be provided on one or more chips (e.g., SDRAM chips) that are arranged on dual inline memory modules (DIMMS). Each DIMM may include a number of SDRAM memory chips (e.g., x8 or x16 memory chips), as will be appreciated. Each SDRAM memory chip may include one or more memory banks 12. The memory device 10 represents a portion of a single memory chip (e.g., SDRAM chip) having a number of memory banks 12. For DDR5, the memory banks 12 may be further arranged to form bank groups. For instance, for an 8 gigabyte (Gb) DDR5 SDRAM, the memory chip may include 16 memory banks 12, arranged into 8 bank groups, each bank group including 2 memory banks. For a 16 Gb DDR5 SDRAM, the memory chip may include 32 memory banks 12, arranged into 8 bank groups, each bank group including 4 memory banks, for instance. Various other configurations, organization and sizes of the memory banks 12 on the memory device 10 may be utilized depending on the application and design of the overall system.

The memory device 10 may include a command interface 14 and an input/output (I/O) interface 16. The command interface 14 is configured to provide a number of signals (e.g., signals 15) from an external device (not shown), such as a processor or controller. The processor or controller may provide various signals 15 to the memory device 10 to facilitate the transmission and receipt of data to be written to or read from the memory device 10.

As will be appreciated, the command interface 14 may include a number of circuits, such as a clock input circuit 18 and a command address input circuit 20, for instance, to ensure proper handling of the signals 15. The command interface 14 may receive one or more clock signals from an external device. Generally, double data rate (DDR) memory utilizes a differential pair of system clock signals, referred to herein as the true clock signal (Clk_t) and the complementary clock signal (Clk_c). The positive clock edge for DDR refers to the point where the rising true clock signal Clk_t crosses the falling complementary clock signal Clk_c, while the negative clock edge indicates that transition of the falling true clock signal Clk_t and the rising of the complementary clock signal Clk_c. Commands (e.g., read command, write command (WrCmd), etc.) are typically entered on the positive edges of the clock signal and data is transmitted or received on both the positive and negative clock edges.

The clock input circuit 18 receives the true clock signal (Clk_t) and the complementary clock signal (Clk_c) and generates an internal clock signal CLK. The internal clock signal CLK is supplied to an internal clock generator, such as a delay locked loop (DLL) circuit 30. The DLL circuit 30 generates a phase controlled internal clock signal LCLK based on the received internal clock signal CLK. The phase controlled internal clock signal LCLK is supplied to the I/O interface 16, for instance, and is used as a timing signal for determining an output timing of read data.

The internal clock signal CLK may also be provided to various other components within the memory device 10 and may be used to generate various additional internal clock signals. For instance, the internal clock signal CLK may be provided to a command decoder 32. The command decoder 32 may receive command signals from the command bus 34 and may decode the command signals to provide various internal commands. For instance, the command decoder 32 may provide command signals to the DLL circuit 30 over the bus 36 to coordinate generation of the phase controlled internal clock signal LCLK. The phase controlled internal clock signal LCLK may be used to clock data through the IO interface 16, for instance.

Further, the command decoder 32 may decode commands, such as read commands, write commands, mode-register set commands, activate commands, etc., and provide access to a particular memory bank 12 corresponding to the command, via the bus path 40. As will be appreciated, the memory device 10 may include various other decoders, such as row decoders and column decoders, to facilitate access to the memory banks 12. In one embodiment, each memory bank 12 includes a bank control block 22 which provides the necessary decoding (e.g., row decoder and column decoder), as well as other features, such as timing control and data control, to facilitate the execution of commands to and from the memory banks 12.

The memory device 10 executes operations, such as read commands and write commands, based on the command/address signals received from an external device, such as a processor. In one embodiment, the command/address bus may be a 14-bit bus to accommodate the command/address signals (CA<13:0>). The command/address signals are clocked to the command interface 14 using the clock signals (Clk_t and Clk_c). The command interface 14 may include a command address input circuit 20 which is configured to receive and transmit the commands to provide access to the memory banks 12, through the command decoder 32, for instance. In addition, the command interface 14 may receive a chip select signal (CS_n). The CS_n signal enables the memory device 10 to process commands on the incoming CA<13:0> bus. Access to specific banks 12 within the memory device 10 is encoded on the CA<13:0> bus with the commands.

In addition, the command interface 14 may be configured to receive a number of other command signals. For instance, a command/address on die termination (CA_ODT) signal may be provided to facilitate proper impedance matching within the memory device 10. A reset command (RESET_n) may be used to reset the command interface 14, status registers, state machines and the like, during power-up for instance. The command interface 14 may also receive a command/address invert (CAI) signal which may be provided to invert the state of command/address signals CA<13:0> on the command/address bus, for instance, depending on the command/address routing for the particular memory device 10. A mirror (MIR) signal may also be provided to facilitate a mirror function. The MIR signal may be used to multiplex signals so that they can be swapped for enabling certain routing of signals to the memory device 10, based on the configuration of multiple memory devices in a particular application. Various signals to facilitate testing of the memory device 10, such as the test enable (TEN) signal, may be provided, as well. For instance, the TEN signal may be used to place the memory device 10 into a test mode for connectivity testing.

The command interface 14 may also be used to provide an alert signal (ALERT_n) to the system processor or controller for certain errors that may be detected. For instance, an alert signal (ALERT_n) may be transmitted from the memory device 10 if a cyclic redundancy check (CRC) error is detected. Other alert signals may also be generated. Further, the bus and pin for transmitting the alert signal (ALERT_n) from the memory device 10 may be used as an input pin during certain operations, such as the connectivity test mode executed using the TEN signal, as described above.

Data for read and write commands may be sent to and from the memory device 10, utilizing the command and clocking signals discussed above, by transmitting and receiving data signals 44 through the IO interface 16. More specifically, the data may be sent to or retrieved from the memory banks 12 over the data path 46, which includes a plurality of bi-directional data buses. Data IO signals, generally referred to as DQ signals, are generally transmitted and received in one or more bi-directional data busses. For certain memory devices, such as a DDR5 SDRAM memory device, the IO signals may be divided into upper and lower bytes. For instance, for a x16 memory device, the IO signals may be divided into upper and lower IO signals (e.g., DQ<15:8> and DQ<7:0>) corresponding to upper and lower bytes of the data signals, for instance.

The data (e.g., signals 44) for read and writes may be addressed to certain memory (e.g., memory cells) in the memory banks 12. The techniques described herein provide for address fault detection, for example, by using an address fault detection system 50. The address fault detection system 50 may include logic and/or circuitry that may enable the detection of certain incorrect addresses being used. In some embodiments, addresses incoming from, for example, command interface 14, and, in some embodiments, data incoming from, for example, the I/O interface 16, may be processed via the address fault detection system 50. During a data write, the address fault detection system 50 may process the address for the write and create one or more parity bits based on the error code correction (ECC) bits. For example, given 128 bits of data, 8 ECC bits may be used to store ECC information, and 1 bit of ECC parity may then be derived based on the address, herein after referred to as the address parity bit. For odd parity, e.g., when the address parity bit is 1, the ECC bits may all be inverted (e.g., 1's turned into 0's and 0's turned into 1's). For even parity, e.g., when the address parity bit is 0, the ECC bits may not be inverted.

The ECC bits may then be stored, along with or modified by the address parity bit. It is to be noted that an ECC system may be reused by the address fault detection system 50, as further described below. The ECC system may additionally include or use certain storage space for an ECC parity bit, which the address fault detection system 50 may now coopt as the address parity bit. During a data read, the address fault detection system 50 may use the address parity bit generated from the read address to restore the ECC bits. For example, by inverting (e.g., for odd address parity) the ECC bits, or by non-inverting (e.g., for even parity) the ECC bits based on the read address. The resulting ECC bits may then be used during the data read. If an incorrect address is used to restore the ECC bits, the data may appear to be corrupt. Indeed, the corruption may appear such that the ECC system may then flag the data as too corrupt to correct. The address fault detection system 50 may then flag the address as an incorrect address. By minimizing or eliminating the use of incorrect addresses, the techniques described herein may enable the device 10 to avoid use of erroneous data resulting from an addressing fault.

An impedance (ZQ) calibration signal may also be provided to the memory device 10 through the 10 interface 16. The ZQ calibration signal may be provided to a reference pin and used to tune output drivers and ODT values by adjusting pull-up and pull-down resistors of the memory device 10 across changes in process, voltage and temperature (PVT) values. Because PVT characteristics may impact the ZQ resistor values, the ZQ calibration signal may be provided to the ZQ reference pin to be used to adjust the resistance to calibrate the input impedance to known values. As will be appreciated, a precision resistor is generally coupled between the ZQ pin on the memory device 10 and GND/VSS external to the memory device 10. This resistor acts as a reference for adjusting internal ODT and drive strength of the IO pins.

In addition, a loopback signal (LOOPBACK) may be provided to the memory device 10 through the IO interface 16. The loopback signal may be used during a test or debugging phase to set the memory device 10 into a mode wherein signals are looped back through the memory device 10 through the same pin. For instance, the loopback signal may be used to set the memory device 10 to test the data output (DQ) of the memory device 10. Loopback may include both a data and a strobe or possibly just a data pin. This is generally intended to be used to monitor the data captured by the memory device 10 at the IO interface 16.

As will be appreciated, various other components such as power supply circuits, mode registers (to define various modes of programmable operations and configurations), read/write amplifiers (to amplify signals during read/write operations), temperature sensors (for sensing temperatures of the memory device 10), etc., may also be incorporated into the memory system 10. Accordingly, it should be understood that the block diagram of FIG. 1 is only provided to highlight certain functional features of the memory device 10 to aid in the subsequent detailed description. For example, the address fault detection system 50 or certain circuitry of the address fault detection system 50 may be disposed as part of one memory bank 12, the bank controller 22, or combinations thereof. It is also noted that while the address fault detection system 50 is depicted as part of the memory device 10, the address fault detection system 50 may be included in other memory devices such as persistent memory (e.g., non-volatile dual in-line memory module (NVDIMM)), low power DRAM (LPDRAM), and so on.

Figure 2:
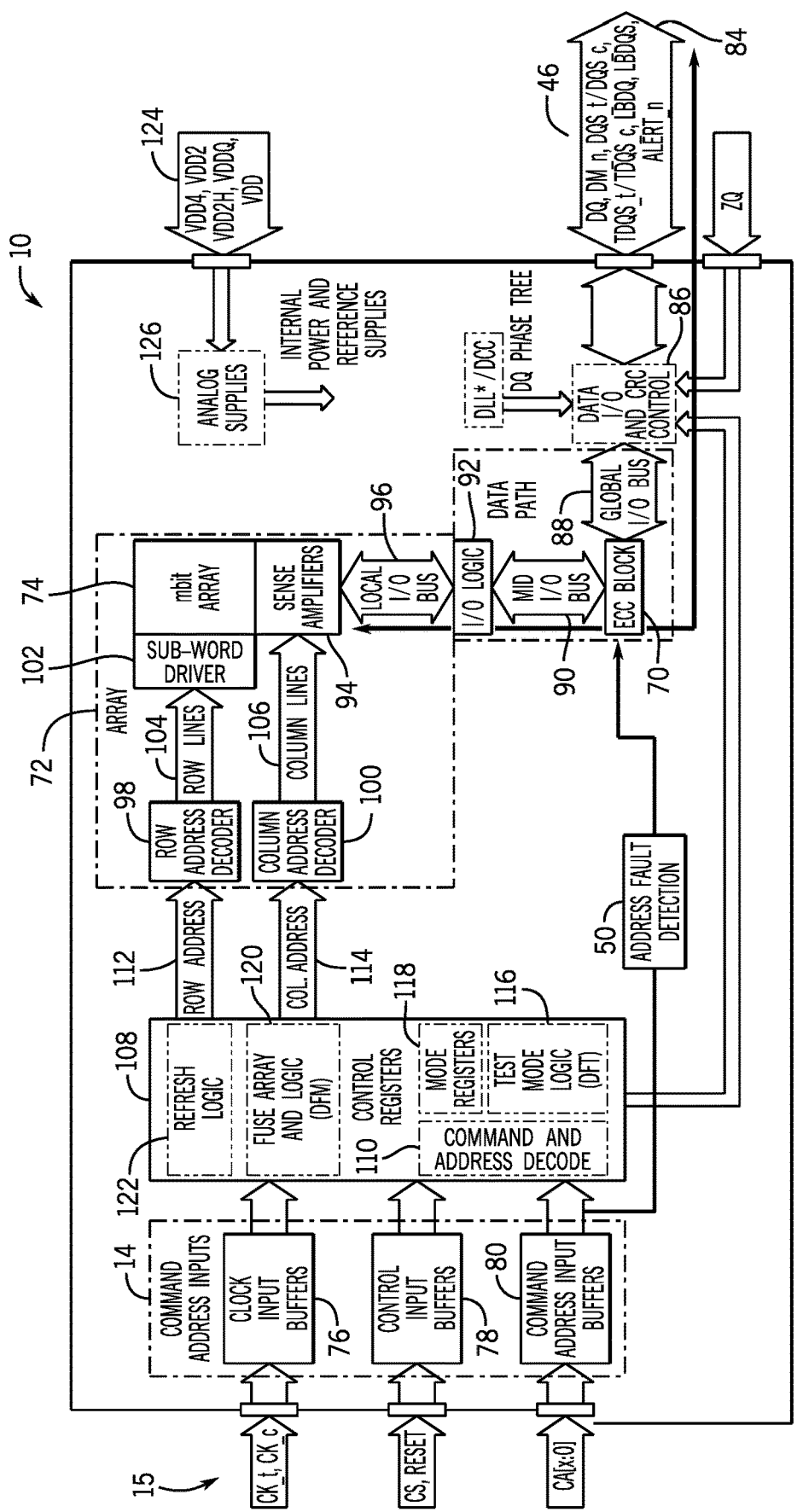
FIG. 2 is a block diagram of a memory device that includes an error code correction (ECC) system operatively coupled to the address fault detection system of FIG. 1, in accordance with an embodiment.

It would be beneficial to illustrate further details of the memory device 10 having an embodiment of the address fault detection system 50. Accordingly, FIG. 2 depicts an embodiment of the memory device 10 having the address fault detection system 50 operatively coupled to the command interface 14 and to an ECC system 70. During operations of the memory device 10, addresses may be used to indicate a location in a memory array 72 (e.g., memory bank 12) to store and/or to retrieve data from. In some cases, the address used may be part of a codeword. For example, for DDR5 devices, the codeword may include a 128 data bits and 8 parity bits (e.g., ECC bits), and the resulting 136 bits may then be stored in an mbit array 74. In one example, signals 15 representative of a data write may result in the command interface 14 transmitting clock input buffer 76 signals, control input buffer 78 signals, and/or command address input buffer 80 signals representative of a clock signal, a control input or command, and an address (e.g., mbit array 74 address), respectively.

The address fault detection system 50 may intercept the command address input buffer 80 signal and process the signal based on whether a write or a read of data (e.g., based on control input buffer 78 signal) is desired. During a write, a write address may be intercepted by the address fault detection system 50 and then an address parity bit may be derived, for example, by XORing the write address. Accordingly, if a number of logic 1 bits in the address is odd, an address parity bit may be derived having a logic 1. If the number of logic 1 bits in the address is even, the address parity bit may be derived as having a logic 0.

During the write process, the ECC bits may be first derived by the ECC system 70, for example, by using a Hamming code, where for each integer r≥2 there is a codeword with block length $n=2^r-1$ and message length $k=2^r-r-1$. Hence a rate of the Hamming code is $R=k/n=1-r/(2^r-1)$. It is to be understood that while the ECC bits may be derived via. Hamming code, other ECC codes may be used, such as Hadamard code. The address fault detection system 50 may, in one embodiment, invert all ECC bits (e.g., 8 ECC bits of a DDR5 136 bit codeword) when the address parity bit is logic 1 (e.g., for odd parity). For even parity, e.g., when the address parity bit is logic 0, the ECC bits may not be inverted and may thus stay as originally derived.

The ECC bits processed by the address fault detection system 50 may then be communicated to the ECC system 70. In one embodiment, the ECC system 70 may be an on-chip ECC system that is provided as part of the memory device 10 as shown. The ECC system 70 may store the ECC bits in the ECC system 70 and/or in the mbit array 74. In certain embodiments, the ECC system 70 may include an extra ECC parity bit useful in checking parity for the ECC bits themselves. That is, there may be n+1 ECC bits, the last bit being a parity bit for the previous ECC bits. The ECC system 70 may be included in or communicatively coupled to the data path 46. For example, the data path 46 may receive read data training strobe (DQS_t), data pad (DQ), and or data mask (DM) signals 84 representative of reading and/or writing data for the device 10 (e.g., DDR device), process the signals 84 via a data I/O and control block 86 to place the signals 84, including data, in a global I/O bus 88. The ECC system 70 may then store the data in the mbit array 74. More specifically, the data may traverse a mid I/O bus 90 into an I/O logic block 92 that may then use sense amplification circuitry 94 to store the data incoming through a local I/O bus 96 in the mbit array 74. It is to be noted that the stored data is thus associated with the ECC bits processed by the address fault detection system 50.

Also shown are a row address decoder circuitry 98 and a column address decoder circuitry 100 that may be used to determine locations in the mbit array 74 to store the data. Accordingly, the row address decoder block 98 may be communicatively coupled to a sub word driver circuitry 102 via row lines 104 and the column address decoder 100 may be communicatively coupled to the sense amplifiers 94 via column lines 106. In operation, control registers 108 may receive the write address, for example from the command address input buffers 80, and a command and address decode block 110 may then be used to derive a row address 112 and a column address 114 used by the row address decoder 98 and the column address decoder 100, respectively. The control registers 108 may additionally include test mode logic (e.g., design for testing or DFT logic) 116 suitable for device 10 testing and mode registers 118 suitable for setting certain memory modes, such as debug modes. A fuse array and logic (e.g., design for manufacturability or DFM logic) 120 may be used for various test modes. A refresh logic 122 may also be included, which may be used to refresh the mbit array 74 by providing electric signals or power at certain times so that the data stored in the mbit array 74 remains ready to be used. Voltages 124 may be applied to the memory device 10, for example, into an analog supplies block 126, which may then provide for internal power to the memory device 10 as well as reference voltages and/or currents. Other clock signals (WCK) 128 may also be used during I/O activities, for example.

During write operations the address fault detection system 50 may derive a write address parity by XORing the write address. The write address parity then may be used to determine whether to invert the ECC bits or not when the ECC bits are written. A logic 1 write address parity bit may result in inverting the ECC bits while a logic 0 write address parity bit may result in not inverting the ECC bits. The ECC bits may then be written or stored. During read operations, the address fault detection system 50 may derive a read address parity (e.g., by XORing the read address) and then use the previously stored ECC bits and the newly derived read address parity bit of the data being requested at the read address. That is, the read address may be used to load the ECC bits and then to derive the read address parity bit.

If the syndrome is 0 then there are no bit errors in the data and also no detected address errors. If the syndrome has one logic 1 bit, then there may be a one bit error that can be corrected in the data and no detected address error. A syndrome flag may be raised, denoting the data bit error. If the syndrome has more than one logic 1 bit the data may have multiple bit errors or a detected addressing error, neither of which may be correctable. A syndrome flag may be raised, denoting the data bit errors. If the derived address of the XOR result is a logic 1 for read and the ECC bits were written from a logic 1 address parity write, then the ECC bits may not be inverted (they were inverted during write due to logic 1 address parity and then inverted back during read due to logic 1 address parity). As mentioned above, if the syndrome (e.g., based on the ECC inverted bits) is zero, there may be no bit errors and no detected address error. A syndrome flag may not be raised. If the syndrome has one logic 1 bit, then there may be a one bit error that can be corrected in the data and no detected address error. A syndrome flag may be raised, denoting the data bit error. If the syndrome has more than one logic 1 bit the data may have multiple bit errors which may not be correctable. A syndrome flag may be raised, denoting the data bit errors.

Discrepancies between the read-derived address XOR result (address parity bit) and the write-derived XOR result (address parity bit) previously used to write the ECC may be handled differently. For example, if the derived address of the XOR result is a logic 1 for read and the ECC bits were written from a logic 0 address parity write, there may be an address fault. The ECC bits will be inverted (e.g., because the ECC bits were inverted during the read operation). If the derived syndrome is 255 (i.e., the maximum value for 8-bit ECC), there may be no data errors, but due to non-zero syndrome, the syndrome flag may then be raised. If the derived syndrome has all but one bit as a logic 1, then there may be a 1 bit error in the data in addition to the address error. The syndrome flag may then be raised If the derived syndrome has multiple bits as logic 1 then there may be multibit errors in the data, an address error, or both. For each of these situations, the syndrome flag may then be raised, but the errors may not be correctable.

If the derived address of the XOR result is a logic 0 and the stored address parity is a logic 1, there may be an address fault and the ECC bits may be inverted. If the derived syndrome has all but one bit as a logic 1, then there may be a 1 bit error in the data in addition to the address error. The syndrome flag may then be raised but the address error may not be correctable. If the derived syndrome has multiple bits as logic 1 then there may be multibit errors in the data, an address error, or both. The syndrome flag may then be raised, but the multibit errors may not be correctable.

By storing the write address parity in lieu of storing the parity of the ECC bits, the techniques described herein may derive the existence of certain address issues while reusing existing ECC systems, such as the ECC system 70. For example, the address fault detection system 50 may functionally use a previously existing ECC system 70 to divide addresses into even and odd parity addresses, and then check for address faults based on the division, while preserving the full functionality provided by the existing ECC system 70 and without using additional storage.

Figure 3:
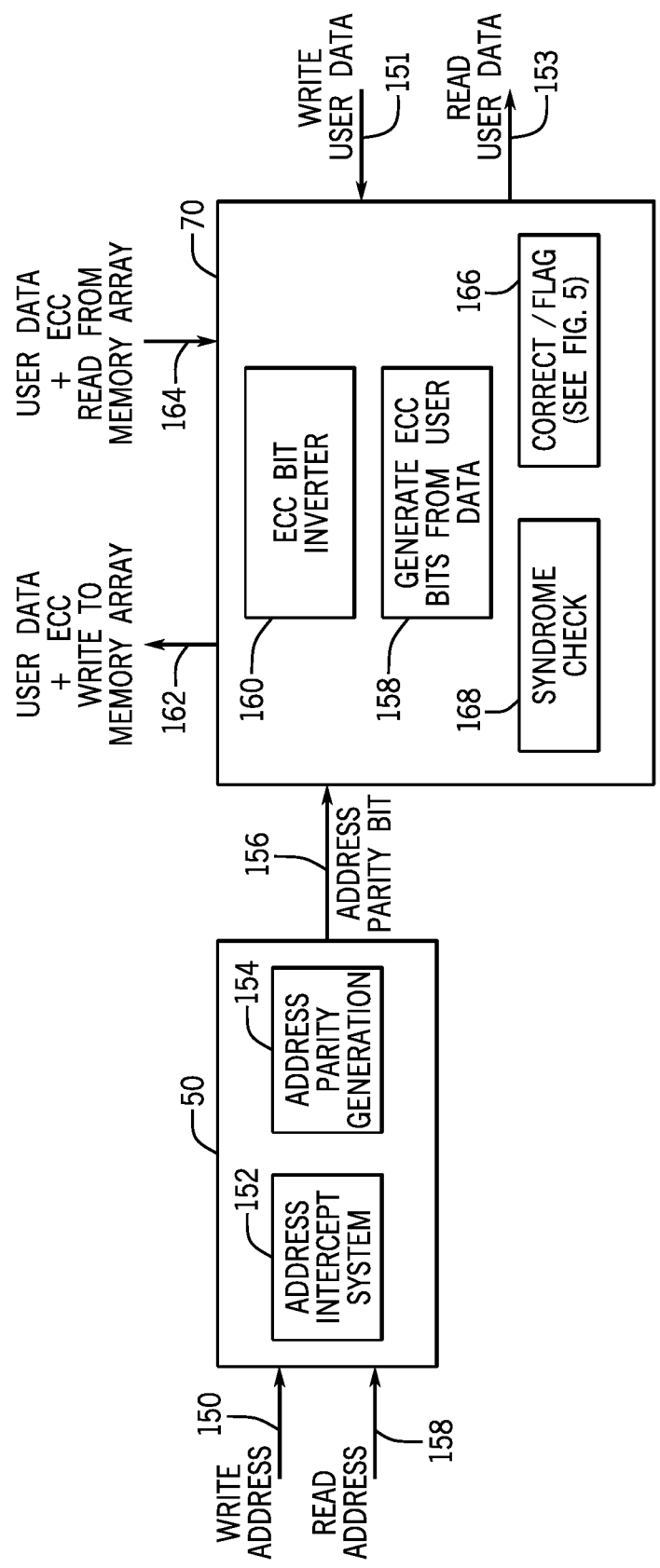
FIG. 3 depicts further details of the address fault detection system included in the memory device of FIG. 1, in accordance with an embodiment.

It may be beneficial to show further details of the address fault detection system 50. Accordingly, FIG. 3 is a block diagram of an embodiment of the address fault detection system 50 illustrating a write address 150 received (e.g., via the command address input buffers 80) by an address intercept system 152. The address intercept system 152 may include electrical conduits, buffers, latches, gates, clocks, and so on, that may intercept the write address 150 for further processing. Once the write address 150 has been intercepted, the write address 150 may be encoded via an address parity generation system 154. In one embodiment, the encoding includes deriving a parity for the write address 150, for example by XORing the write address 150. The result of the XORing may thus be a logic 1 (e.g., odd parity) or a logic 0 (e.g., even parity). The encoded bit 156 may then be communicated to the ECC system 70.

As mentioned earlier, in certain embodiments, the encoded bit(s) 156 may be further processed via the ECC system 70. In embodiments where a single bit is used as the encoded bit 156, the parity bit used to determine parity for the ECC bits may be used as storage. However, the techniques described herein may use additional bits for encoding. During a write operation 151, the write address 150 may be intercepted by the address intercept system 152. The intercepted write address may then have an address parity derived via the address parity generation system 154, e.g., via XORing. The result of the XORing may thus be a logic 1 (e.g., odd parity) or a logic 0 (e.g., even parity).

The address parity bit 156 may now be used by the ECC system 70. For logic 0 bits 156, the ECC system 70 may generate ECC bits via a ECC generation system 158. More specifically, the ECC bits generated for even parity of the address parity bit 156 may be the same ECC bits that are generated during typical operations of the ECC system 70. The ECC system 70 may then write the user data and the ECC bits 162 into the memory array 74. For logic 1 bits 156, e.g., odd parity addresses, the generated ECC bits may all be inverted via an ECC bit inverter system 160. The inverted ECC bits and the user data 162 may then be written into the memory array 74.

During a read operation 153, the address intercept system 152 may intercept a read address 158. For example, received via the command address input buffers 80. The read address 158 may then be processed by the address parity generation system 154. The address parity generation system 154 may, for example, derive a parity for the read address 158, for example by XORing the read address 158. The result of the XORing may thus be a logic 1 (e.g., odd parity) or a logic 0 (e.g., even parity). The derived address parity bit 156 may then be transmitted to the ECC system 70.

User data and ECC bits 164 for the read address 158 may be read from the array 74. The ECC system 70 may then use the address parity bit 156 to either invert or leave the ECC bits 164 as is. For even parity bits 156, the ECC bits may be left as is. For odd parity bits 156, the ECC bits 164 may be inverted by the ECC bit inverter system 160.

The ECC system 70 may compare the stored address parity 164 with the derived address parity 156 for the read address 158. If the derived read address parity 156 of the read address 158 does not match the previously stored address parity 164, then the address fault detection system 50 may derive that an address fault has occurred, and raise and address fault indication flag 166.

If the derived read address parity 156 matches the stored address parity 164, that is if the address parity bit 156 and stored parity bit 164 are both logic 0, or if the address parity bit 156 and stored parity bit 164 are both logic 1, the address is determined to be a valid address. The syndrome may then be calculated using a syndrome check system 168.

If the syndrome is 0 then there are no bit errors in the data and also no detected address errors. If the syndrome has one logic 1 bit, then there is a one bit error that can be corrected in the data and no detected address error. The syndrome flag 166 may be raised, denoting the data bit error. If the syndrome has more than one logic 1 bit the data may have multiple bit errors which may not be correctable. The syndrome flag 166 may be raised, denoting the data bit errors.

Differences between the derived address XOR result and the stored address parity may then be handled as follows. If the derived address of the XOR result (e.g., bit 156) is a logic 1 and the stored address parity (e.g., stored in bits 164) is a logic 0, there may be an address fault. The ECC bits will be inverted (e.g., because the ECC bits were inverted during the write operation). If the derived syndrome is 255, there may be no data errors, but due to the mismatch between the derived address XOR result and the stored address parity bit the syndrome flag 166 may then be raised. If the derived syndrome has all but one bit as a logic 1, then there may be a 1 bit error in the data in addition to the address error. The syndrome flag 166 may then be raised but the address error may not be correctable. If the derived syndrome has multiple bits as logic 1 then there may be multibit errors in the data, an address error, or both. The syndrome flag 166 may then be raised, but the multibit errors may not be correctable.

If the derived address parity bit 156 is a logic 0 and the stored address parity 164 is a logic 1, there may be an address fault and the ECC bits may be inverted. If the derived syndrome has all but one bit as a logic 1, then there may be a 1 bit error in the data in addition to the address error. The syndrome flag 166 may then be raised but the address error may not be correctable. If the derived syndrome has multiple bits as logic 1 then there may be multibit errors in the data, an address error, or both. The syndrome flag 166 may then be raised, but the multibit errors may not be correctable. Accordingly, the address fault detection system 50 may provide for reuse of ECC data bits to derive address faults.

Figure 4:
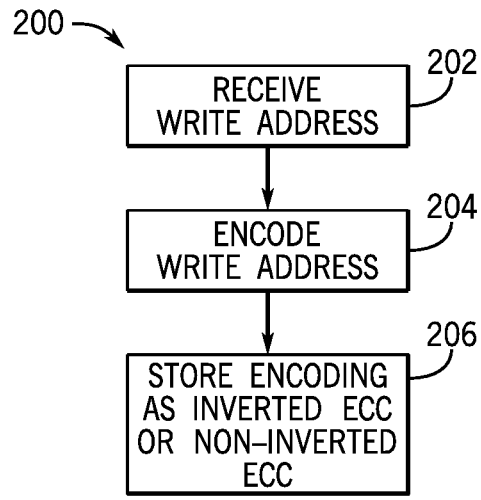
FIG. 4 is a flowchart of a write process for the address fault detection system of FIG. 1, in accordance with an embodiment.

FIG. 4 is a flowchart illustrating an embodiment of a write process 200 suitable for reusing an existing ECC system, such as the ECC system 70, for address fault detection. The process 200 may be performed via the address fault detection system 50, for example. In the depicted embodiment, the process 200 may receive (block 202) a write address at which to store data using a storage system, such as the mbit array 74. In one embodiment, the write address may be received by the address intercept system 152. The write address may be a series of bits (e.g., 64 bits) pointing to a location in the memory device 10 at which to store data.

The process 200 may then encode (block 204) the write address. In one embodiment, the encoding may be deriving a parity by XORing the write address. As mentioned earlier, the XORing of the write address may result in a logic 0 for even parity write addresses and a logic 1 for odd parity write addresses. In some embodiments, other encodings may be used. Additionally or alternatively, the write address may be split into multiple sections and each section may be encoded separately. For example, a 64 bit address may be split into two (e.g., 32 bit), four (e.g., 16 bit), or more sections and each section encoded separately, e.g., via XORing.

The process 200 may then store (block 206) the encoded write address, e.g., the parity bit that has been derived. That is the encoding (e.g., address parity calculation) may be stored as inverted ECC when the address parity is a logic 1 or non-inverted ECC when the address parity is a logic 0. Inverting (or not inverting) takes place after the device 10 encodes the ECC parity bits on the written data, that is, as the user data+ECC parity bits 162 leave the ECC system 70 on their way toward the array 74 to be written. In one embodiment, the process 200 may reuse the ECC system's storage. For example, the ECC system 70 may include or use storage for certain parity bits, such as for a parity of the ECC bits. Accordingly, the process 200 may store (block 206) 1 bit address encodings in the ECC parity bits. It is to be noted that, in other embodiments, the process 200 may store the write address encodings in other non ECC system related storage areas.

Figure 5:
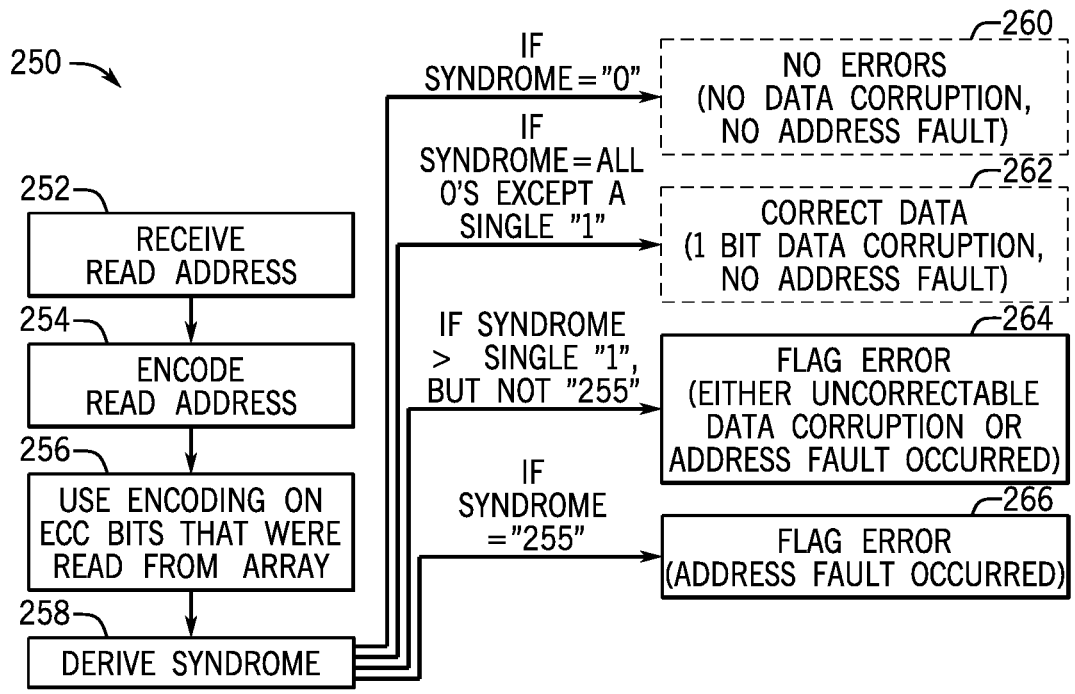
FIG. 5 is a flowchart of a read process for the address fault detection system of FIG. 1, in accordance with an embodiment.

FIG. 5 is a flowchart illustrating an embodiment of a read process 250 suitable for reusing an existing ECC system, such as the ECC system 70, for address fault detection and/or data correction. The process 250 may be performed via the address fault detection system 50, for example. In the depicted embodiment, the process 250 may receive (block 252) a read address at which to read data from a storage system, such as the mbit array 74. In one embodiment, the read address may be received by the address intercept system 152. The read address may be a series of bits pointing to a location in the memory device 10 from which to read data.

The process 250 may then encode (block 254) the read address. In one embodiment, the encoding may include deriving a parity for the read address, e.g., by XORing the read address. XORing of the read address may result in a logic 0 for even parity read addresses and a logic 1 for odd parity read addresses. In some embodiments, other encodings may be used.

During a data read command, the process 250 may intercept a read address (block 252) and use the read address to retrieve (block 254) a previously saved address encoding. For example, the address encoding may have been saved via the process 200 described above during a data write command 151. The address encoding may have previously been saved, for example, as part of ECC write operations that stored the data 162 based on the same address as the current read address.

The encoding may then be used (block 256) to either invert or to not invert, for example, the ECC parity bits that were read from the array 74. In one example, the inverting (or not inverting) takes place as the user data and ECC parity bits enter the ECC block 70. The ECC parity bits may be inverted if the read address retrieved has an address parity of logic 1, and not inverted if the read address retrieved has an address parity of logic 0.

The process 250 may then derive (block 258) the syndrome (e.g., via the ECC block 70) and proceed with further steps. For example, if the derived syndrome is zero (block 260), there may be no errors in the data and the read address may be valid. If the derived syndrome is all zeros with a single "1" (block 262), the data may have a 1 bit error that is correctable, and no address fault. If the derived syndrome has more than a single "1" but not 255 (e.g., all "1s") (block 264), there may either be data that is not correctable or an address fault may have occurred. If the syndrome is 255 (e.g., all "1s") (block 266), there may be an address fault. Blocks 264 and 266 may also raise an error, thus informing that certain undesired conditions are present.

While the embodiments described herein may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the techniques and system described in the disclosure as defined by the following appended claims.

What is claimed is:

1. A memory device, comprising:
a memory bank configured to store data in one or more memory cells; and
an address fault detection system configured to:
intercept a read address denoting a location to read data from the memory bank;
encode the read address to generate an encoded read address;
read a stored code by using the read address, wherein the stored code is generated based on a write address when the data is written to the memory bank;
decode the stored code based on the encoded read address;
detect an address fault by using the decoded stored code during reading the data from the read address; and
raise an address fault indication flag if the address fault is detected, which is indicated by a corruption of the data.

2. The memory device of claim 1, wherein the encoded read address comprises a parity encoding.

3. The memory device of claim 2, wherein the parity encoding comprises an XORing of all bits in the read address to derive the encoded read address.

4. The memory device of claim 1, comprising an error correction code (ECC) system configured to derive a syndrome based on the decoded stored code, wherein the syndrome is used to detect the address fault.

5. The memory device of claim 4, wherein the address fault is detected when the syndrome has more than one logic 1 bit.

6. The memory device of claim 5, wherein the address fault detection system is configured to invert the stored code when the encoded read address comprises an address parity having a logic 1 value.

7. The memory device of claim 1, wherein the address fault detection system is configured to encode the write address to generate an encoded write address; and store the encoded write address.

8. The memory device of claim 7, wherein the address fault detection system is configured to detect the address fault if the stored encoded write address is not equal to the encoded read address.

9. The memory device of claim 8, wherein the memory device comprises a dynamic random access memory (DRAM) device having an ECC system operatively coupled to the address fault detection system.

10. A method for reading or writing data to a memory device, comprising:
intercepting, via an address fault detection system, a write address denoting a location to store data in a memory bank;
encoding, via the address fault detection system, the write address to generate an encoded write address; and
generating, via an error correction code (ECC) system, a code using ECC bits generated for the data based on the encoded write address and storing the code to the write address, wherein the ECC system is configured to detect one or more bit errors in the data stored in the memory bank, and wherein the address fault detection system is configured to detect an address fault based on a corruption of the data during reading the data.

11. The method of claim 10, comprising:
intercepting, via the address fault detection system, a read address denoting the location to read the data from in the memory bank;

encoding, via the address fault detection system, the read address to generate an encoded read address;

reading, via the address fault detection system, the stored code using the read address;

decode the stored code based on the encoded read address;

detecting, via the address fault detection system, the address fault by using the decoded stored code during reading the data from the read address; and raising an address fault indication flag if the address fault is detected, which is indicated by the corruption of the data.

12. The method of claim 11, wherein the address fault detection system or a portion of the address fault detection system is included in the ECC system.

13. The method of claim 12, comprising inverting the ECC bits based on the encoded write address.

14. The method of claim 13, comprising determining the address fault based on whether the ECC bits are inverted or not.

15. The method of claim 11, wherein encoding the read address to generate the encoded read address comprises XORing all bits in the read address.

16. A memory device, comprising:
an error correction code (ECC) system configured to detect one or more bit errors in data stored by a memory bank; and
an address fault detection system configured to:
intercept a read address denoting a location to read data from the memory bank;
encode the read address to generate an encoded read address;
read a stored code by using the read address, wherein the stored code is generated based on a write address when the data is written to the memory bank;
decode the stored code based on the encoded read address;
detect an address fault by using the decoded stored code during reading the data from the read address; and
raise an address fault indication flag if the address fault is detected, which is indicated by a corruption of the data, wherein the address fault detection system or a portion of the address fault detection system is included in the ECC system.

17. The memory device of claim 16, wherein the address fault detection system is configured to encode the write address to generate an encoded write address; and store the encoded write address.

18. The memory device of claim 17, wherein the address fault detection system is configured to detect the address fault if the stored encoded write address is not equal to the encoded read address.

19. The memory device of claim 16, wherein the address fault detection system is configured to invert ECC bits of the data generated by the ECC system based on the encoded write address.

20. The memory device of claim 19, wherein the address fault detection system is configured to determine the address fault based on whether the ECC bits are inverted or not.

* * * * *